(12) United States Patent
Huang et al.

(10) Patent No.: US 8,476,335 B2
(45) Date of Patent: Jul. 2, 2013

(54) METHOD OF MANUFACTURING MONOLITHIC STATIONARY PHASE AND MONOLITHIC STATIONARY PHASE PRODUCED THEREBY

(75) Inventors: Hsi-Ya Huang, Zhongli (TW); Yung-Han Shih, Zhongli (TW); Chao-Hsiang Hsu, Zhongli (TW); Wan-Ling Liu, Zhongli (TW); Singco Brenda, Zhongli (TW)

(73) Assignee: Chung Yuan Christian University, Zhongli (TW)

( * ) Notice: Subject to any disclaimer, the term of this patent is extended or adjusted under 35 U.S.C. 154(b) by 0 days.

(21) Appl. No.: 13/235,681

(22) Filed: Sep. 19, 2011

(65) Prior Publication Data

US 2013/0072593 A1     Mar. 21, 2013

(30) Foreign Application Priority Data

Jun. 22, 2011    (CN) ................. 10 01 21934

(51) Int. Cl.
| | |
|---|---|
| C08F 20/22 | (2006.01) |
| C08F 2/46 | (2006.01) |
| B29D 11/00 | (2006.01) |
| H05B 6/68 | (2006.01) |
| C08J 3/28 | (2006.01) |

(52) U.S. Cl.
USPC ................. 522/182; 522/178; 522/1

(58) Field of Classification Search
USPC ............................ 522/182, 178, 1
See application file for complete search history.

(56) References Cited

U.S. PATENT DOCUMENTS

| | | | | |
|---|---|---|---|---|
| 2009/0184039 | A1* | 7/2009 | Xie ............................. | 210/198.2 |
| 2010/0254890 | A1* | 10/2010 | Yang et al. ................. | 423/592.1 |
| 2011/0236295 | A1* | 9/2011 | Anderson et al. .......... | 423/437.1 |
| 2012/0184689 | A1* | 7/2012 | Huang et al. ................. | 525/479 |

OTHER PUBLICATIONS

Xiong Wen Ye, Novel preparation of organic polymer-based monolithic column by microwave radiation, Jun. 18, 2007, Chinese Chemical Letters, 18, 1399-1402.*

Yu-Ping Zhang, Novel method to prepare polystyrene-based monolithic columns for chromatographic and electorphoretic separations by microwave irradiation, 2008, Journal of Chromatography A, 1188, 43-49.*

Yu-Ping Zhang, Fast preparation of polystyrene-based monolith using microwave irradiation for micro-column separation, 2009, Anal Bianal Chem, 394, 617-623.*

Huang, Hsi-Ya et al., A rapid synthetic method for organic polymer-based monoliths in a room temperature ionic liquid medium via microwave-assisted vinylization and polymerization, Green Chemistry, vol. 3, No. 2., Dec. 23, 2010, pp. 296-299.

Huang, Hsi-Ya et al, Poly(divinylbenzene-alkyl methacrylate) monolithic stationary phases in capillary electrochromatography, Journal of Chromatography A, 1217, Jul. 22, 2010, pp. 5839-5847.

Lu, Jianmei et al., Advanced applications of ionic liquids in polymer science, Progress in Polymer Science 34, Jan. 13, 2009, pp. 431-448.

Liao, Liqiong et al., Microwave-Assisted Ring-Opening Polymerization of Trimethylene Carbonate in the Presence of Ionic Liquid, Journal of Polymer Science: Part A: Polymer Chemistry, vol. 45, 2007, pp. 5857-5863.

Eeltink, Sebastiaan et al., Tailoring the Morphology of Methacrylate Ester-Based Monoliths for Optimum Efficiency in Liquid Chromatography, Analytical Chemistry, vol. 77, No. 22, Oct. 13, 2005, pp. 7342-7347.

* cited by examiner

Primary Examiner — Ling Choi
Assistant Examiner — Jessica E Whiteley
(74) Attorney, Agent, or Firm — Jackson IPG PLLC

(57) ABSTRACT

The present invention relates to a method of manufacturing a polymer-based monolithic stationary phase in an ionic liquid reaction medium via microwave-assisted vinylization and polymerization. The invention is time-effective and environmental friendly for not using volatile organic compounds.

15 Claims, 4 Drawing Sheets

| Reaction Medium | Monoliths | Heat-treatment (time)[c] | OM Images[d] |
|---|---|---|---|
| Traditional solvent[a] | BMA-DVB | Water bath (60 min) | |
| | BMA-DVB | Microwave (30 min) | |
| IL solvent[b] | BMA-DVB | Water bath ( 3 min) | |
| | BMA-DVB | Microwave (5 min) | |
| IL solvent[b] | St-DVB | Microwave (5 min) | |
| | BMA-EDMA | Microwave (3 min) | |

[a] Cycloheaxanol and NMP. [b] [C$_6$mim][BF$_4$]. [c] 100°C water bath or 900W microwave oven for microwave radiation. [d] Optical microscope images were magnified at 100X.

Figure 4

METHOD OF MANUFACTURING MONOLITHIC STATIONARY PHASE AND MONOLITHIC STATIONARY PHASE PRODUCED THEREBY

BACKGROUND OF THE INVENTION

1. Field of the Invention

The present invention relates to a method of manufacturing a monolithic stationary phase, and more particularly, to a method of manufacturing a polymer-based monolithic stationary phase in an ionic liquid reaction medium via microwave-assisted vinylization and polymerization, as well as the monolithic stationary phase produced thereby.

2. Description of the Prior Art

Monolithic columns including organic polymer- and silica-based monoliths have been demonstrated to be a very good alternative to particle-packed columns for highly efficient separations in capillary electrochromatography (CEC) and HPLC because their small-sized skeletons and large through-pores can simultaneously reduce the diffusion path length and flow resistance. Several advantages such as low consumption in the sample and mobile phase, limited peak broadening, and good compatibility with mass spectrometric detection also promote the general acceptance of monolithic technology. Moreover, the use of monolithic materials as an attractive alternative in immobilized enzyme reactors (e.g. microreactors) that provide the advantages of low back pressure, high mass transfer, and reduction of the reaction time from several hours to a few minutes, are now finding fast acceptance in various areas such as protein digestion in proteomics, chemical syntheses, and the pharmaceutical industry. Organic polymer monoliths consisting of acrylamide-, methacrylate ester-, and styrenebased polymers have been successfully used as chromatographic stationary phases and immobilized microreactors, however, their preparation including column vinylization and monolith syntheses are often time-consuming (i.e. 3 to 24 hours for vinylization and 15 to 24 hours for monolith synthesis using thermal heating).

Room temperature ionic liquids (RTILs) are salts with melting points below 100 C. In addition to showing valuable properties such as high thermal and chemical stability, and being liquids at ambient temperature, they are considered as promising solvents for green processes because of their negligible vapor pressure. While ILs are already applied in various chemical syntheses, and can lead to significant improvements in the rate and yield of reactions, there have been intensive studies into radical polymerization in ILs recently (See, for example, J. Lua, F. Yana and J. Texter, *Prog. Polym. Sci.*, 2009, 34, 431). It is also suggested that free radical polymerization in ILs results in considerably faster reaction rates and yields, and higher molecular weight than in common solvents. In the presence of ILs as reaction solvents, complete conversion of monomers such as methyl methacrylate or styrene to polymer was achieved within a few hours, but with conventional solvents more time is often required. This is likely due to the increased polarity of the IL medium that improves propagation rate while its increased viscosity reduces the termination rate in polymerization. These influences on chain-termination processes led to high molecular weight products and rapid reaction rates.

Rapid synthesis by microwaves has attracted considerable attention in recent years. One of the most valuable advantages of using microwave heating for chemical synthesis is the dramatic reduction in reaction time since microwave irradiation produces efficient internal heating by direct coupling of microwave energy with the molecules that are present in the reaction mixture. In comparison with reactions under conventional thermal methods such as using oil baths or hot plates, microwave heating is also able to reduce side reactions, increase yields, and improve reproducibility. Studies on microwave-enhanced chemistry have shown that the efficiency of the interaction of molecules in a reaction mixture (substrates, catalyst and solvents) with electromagnetic waves (named "microwave dielectric effect"), mainly depends on the polarity of the reaction mixture. ILs contain anion-cation pairs and therefore have a relatively high density of strong dipoles, which make them promising candidates for microwave absorption. With this, the use of ILs as reaction media in microwave-assisted polymer synthesis has been reported recently. Regarded as green solvents, the use of ILs would contribute to the depletion of volatile organic compounds (VOCs) emission as well as in energy savings (L. Liao, C. Zhang and S. Gong, *J. Polym. Sci., Part A: Polym. Chem.*, 2007, 45, 5857).

To date, no report has been published addressing the feasibility of ILs in the in situ syntheses of organic polymer-based monolith materials which show high potential for chromatographic stationary phases and microreactors in proteomics and chemical syntheses.

SUMMARY OF THE INVENTION

The inventors have conducted extensive study on the manufacture of a polymer-based monolithic stationary phase in an ionic liquid through a microwave-assisted vinylization and polymerization. It has now been unexpectedly found that an ionic liquid acts synergistically with microwave radiation to facilitate the progress of the manufacturing process, and that the whole process can be completed in as in as little as 10 minutes.

Accordingly, a primary aspect of the invention related to a method of manufacturing a monolithic stationary phase comprising the steps of:

(a) providing a substrate having a working surface;

(b) vinylizing the working surface in the presence of an ionic liquid by applying microwave radiation at a power level sufficient for the vinylization, thereby obtaining a vinylized working surface having reactive vinyl groups thereon; and (c) initiating an in situ free radical polymerization of a polymerizable mixture containing a vinyl monomer in the presence of an ionic liquid to result in a polymer-based monolithic stationary phase grafted to the vinylized working surface.

A second aspect of the invention relates to the monolithic stationary phase produced by the method described above. The monolithic stationary phase thus produced possesses a distinctive microstructure with extremely fine granules as described in Example 4 below, suggesting that it is capable of providing an enhanced chromatographic resolution.

BRIEF DESCRIPTION OF THE DRAWINGS

The above and other objects, features and effects of the invention will become apparent with reference to the following description of the preferred embodiments taken in conjunction with the accompanying drawings, in which:

FIG. 4 is a diagram showing the effects of reaction medium and heat-treatment on the formation of monolithic materials in a fused silica column;

DETAILED DESCRIPTION OF THE INVENTION

Figure 1:
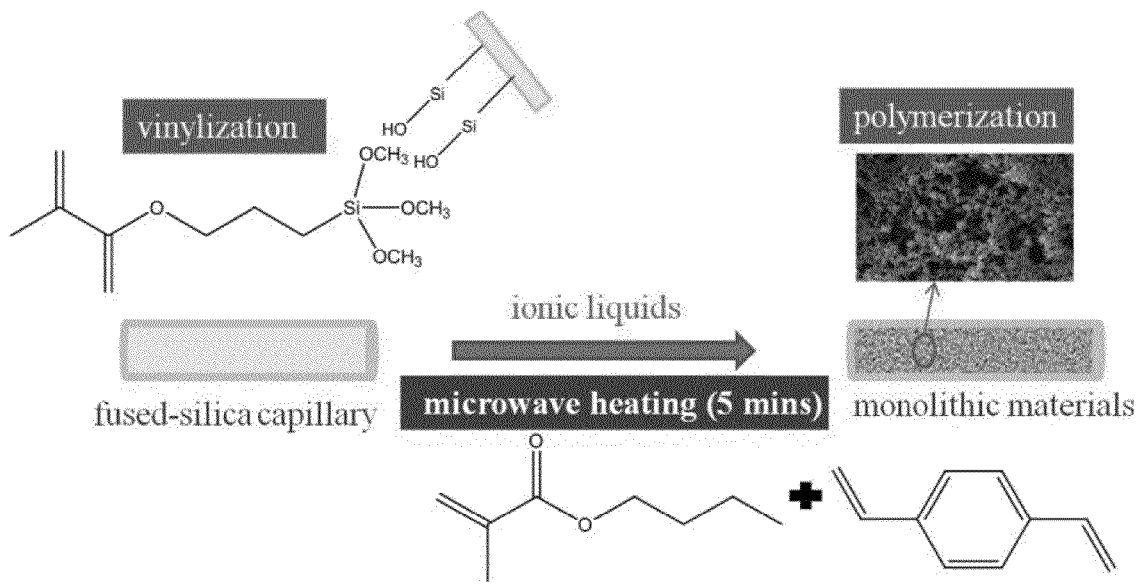
FIG. 1 is a schematic diagram illustrating column vinylization and monolith synthesis with an IL solvent.

As disclosed herein, the inventive method comprises two major technical means: 1) a microwave-assisted vinylization of a surface with an IL as the reaction medium; and 2) in situ monolithic polymer syntheses via a water bath at an elevated temperature or microwave irradiation using an IL as the reaction medium, as depicted in FIG. 1. Preferably, the technical means 2) is performed under microwave radiation at a power level sufficient for the polymerization. As shown in the Examples below, the monolithic materials thus prepared demonstrate high reproducibility and promising performances when they were employed as separation columns in capillary electrochromatography (CEC) and nanoscale liquid chromatography/mass spectrometry (nano-LC/MS).

The terms "vinylizing" and "vinylization" are interchangeably used herein to refer to the covalent attachment of vinyl groups to a working surface of a substrate on which a monolithic stationary phase is to be synthesized. This process is necessary to avoid total or partial detachment of the monolithic materials from the surface. This vinylization is usually carried out by using a compound which contains a chemical group reactive with the working surface of the substrate. Preferably, the vinylization is carried out by using an alkoxy silane compound that is reactive to the working surface of the substrate to create a Si—O—Si linkage and has a pendant vinyl functionality. The most commonly used compounds include, but are not limited to, tetraethylorthosilicate (TEOS), tetramethoxyorthosilicate (TMOS), poly(ethoxydisiloxane) (PEDS), 3-(trimethoxysilyl)propyl methacrylate (MSMA), 3-[tris(trimethylsiloxy)silyl]propyl methacrylate, 3-(diethoxysilyl)propyl methacrylate, 3-(dimethylchlorosilyl) propyl methacrylate, and 3-(trichlorosilyl)propyl methacrylate, and combinations thereof. In the most preferred embodiment, the vinylization proceeds with silanization of 3-(trimethoxysilyl) propyl methacrylate (MSMA) in a fused silica capillary.

The term "substrate" as used herein refers to a support structure upon which a stationary phase may be formed in situ. The substrate may be fabricated in various forms, such as, for example, a chip, a microchip, a capillary column, a closed channel, a pipette tube, a trench, a groove or the like, depending on particular applications. Preferred is a capillary column, which comprises a cylindrical hollow body having an inner working surface for being permanently formed with a monolithic stationary phase and having an inner diameter ranging from about 5 µm to about 0.5 mm, preferably about 50 µm to about 0.5 mm, and more preferably about 100 µm to about 250 µm. The working surface of the substrate is made of glass, metal, plastic or other materials suitable for covalent attachment of vinyl groups. In a preferred embodiment, the working surface of the substrate is provided with silanol functionality (—SiOH). In a more preferred embodiment, the substrate is a fused silica capillary column having an inner diameter of about 100 µm.

The term "polymerizable mixture" is intended to encompass any mixture of monomers that can be polymerized into a polymer-based monolith grafted to the vinylized surface in the presence of a free radical initiator. The mixture contains one or more vinyl monomers. In one embodiment, the mixture contains a polyvinyl monomer. In another embodiment, a mixture of a polyvinyl monomer and a monovinyl monomer is used. Suitable polyvinyl monomers include divinylbenzene, divinylnaphthalene, divinylpyridine, alkylene dimethacrylates, hydroxyalkylene dimethacrylates, hydroxyalkylene diacrylates, oligo ethylene glycol dimethacrylates, oligo ethylene glycol diacrylates, vinyl esters of polycarboxylic acids, divinyl ether, pentaerythritol di-, tri-, or tetramethacrylate or acrylate, trimethylopropane trimethacrylate or acrylate, alkylene bisacrylamides or methacrylamides, and any combinations thereof. The alkylene groups generally contain about 1-6 carbon atoms. Monovinyl monomers include un-substituted and substituted styrenes, acrylates, methacrylates, vinylacetate, vinylpyrrolidone, vinylnaphthalene and any combinations thereof. In a preferred embodiment, the polymerizable mixture comprises butyl methacrylate (BMA) and divinylbenzene (DVB). In another preferred embodiment, the polymerizable mixture comprises styrene and divinylbenzene (DVB). In yet another preferred embodiment, the polymerizable mixture comprises butylmethacrylate (BMA) and ethylene dimethacrylate (EDMA).

The free radical polymerization is initiated and propagated under heat. In one embodiment, the free radical polymerization is performed under heat by applying microwave radiation. In an alternative embodiment, the free radical polymerization is performed by applying heat from a water or oil bath at a temperature sufficient for proceeding with the polymerization, such as at a temperature from about 50° C. to about 400° C., preferably at a temperature of about 50-100° C., and more preferably at a temperature of about 70-100° C. Any conventional initiator effective to achieve a free radical polymerization is useful in the invention, exemplary of which includes 2,2'-azobisisobutyronitrile (AIBN).

As used herein, the term "ionic liquid," or abbreviated as "IL," is intended to encompass salts with melting points below 100° C. The ILs suitable for use in the invention generally consist of a bulky and asymmetric organic cation such as 1-alkyl-3-methylimidazolium, 1-alkylpyridinium and N-methyl-N-alkylpyrrolidinium, accompanied with an inorganic anion such as tetrafluoroborate and hexafluorophosphate or a large organic anion such as bistriflimide, triflate and tosylate. Preferably, the IL utilized in the invention has a dielectric constant ranging from about 8.9 to about 15.2. More preferably, the IL is selected from the group consisting of 1-hexyl-3-methylimidazolium tetrafluoroborate ([C$_6$mim][BF$_4$]), 1-ethyl-3-methylimidazolium bis(trifluoromethylsulfonyl)imide ([Emim] [TF]), 1-butyl-3-methylimidazolium bis(trifluoromethylsulfonyl)imide ([Bmim] [TF]), 1-butyl-3-methylimidazolium tetrafluoroborate ([Bmim] [BF$_4$]). 1-butyl-3-methylimidazolium hexafluorophosphate ([Bmim] [PF$_6$]) and 1-hexyl-3-methylimidazolium hexafluorophosphate ([Hmim] [PF$_6$]). In the inventive method, the vinylization step and the polymerization step are carried out "in the presence of" an IL, meaning that the IL serves as the only solvent in the reaction, or optionally as a major solvent in combination with a secondary solvent, such as water. The vinylization step and the polymerization step may employ the same or different ILs as the reaction media. Advantageously, both of the steps use [$C_6$mim] [$BF_4$] as the reaction media. The respective reactants are dissolved in the IL before being subjected to heat. Desirably, the IL is present in an amount of 50%~85% by volume based on the total volume of the reaction.

The term "microwave radiation" as defined herein refers to electromagnetic waves emitted from a source with frequencies of 0.3-300 GHz and with wavelengths from 1.5 to 1498 cm. The application of microwave radiation to the vinylation and polymerization reactions can be realized by any conventional way. For example, the reaction can be placed into a domestic microwave oven to receive the microwave radiation. The microwave radiation is applied at a power level sufficient for the vinylization and polymerization reactions, normally at a power level of about 800-1000 W, and continued until the completion of the respective reactions, usually only taking less than 1 hour, preferably less than 30 minutes, more preferably less than 10 minutes, and most preferably about 5 minutes for each application as shown in the Examples below.

PREFERRED EMBODIMENTS FOR PRACTICING THE INVENTION

The following Examples are given for the purpose of illustration only and are not intended to limit the scope of the present invention.

Example 1

Effect of Reaction Medium and Heat-Treatment on Vinylization Procedure

Figure 3:
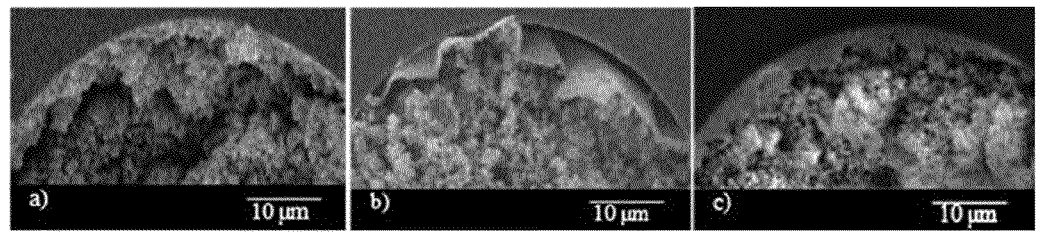
FIG. 3 shows SEM images of three BMA-DVB monolith columns with different vinylization pretreatments of the capillary inner wall, in which the respective capillaries were filled with solutions of MSMA and MeOH in a volume ratio of 1:1 and then heated in a) 35° C. water bath for 17 h, b) microwave oven for 5 min, and c) filled with solutions of MSMA and [C$_6$min] [BF$_4$] in a volume ratio of 1:1 and then heated in microwave oven for 5 min.

A 100-μm I.D. capillary column was filled with vinylization solution composed of MSMA mixed with methanol or [$C_6$mim] [$BF_4$] (50%, v/v). Once both ends of the capillaries were sealed with epoxy adhesive, the capillaries were heat-treated either in water bath at 100° C. or microwave oven (900 W, SAMPO RE-1002SM) in a beaker with RT water (FIG. 1). Capillaries were treated with three different vinylization conditions, including conventional condition (i.e. 35° C. water bath for 17 hours in a methanol medium, FIG. 3a) and our proposed conditions (i.e. microwave heating for 5 min in methanol (FIG. 3b) or [$C_6$mim] [$BF_4$] medium (FIG. 3c). The resultant capillaries were employed to prepare poly(butyl methacrylate-divinylbenzene) (BMA-DVB) monolith materials.

Figure 2:
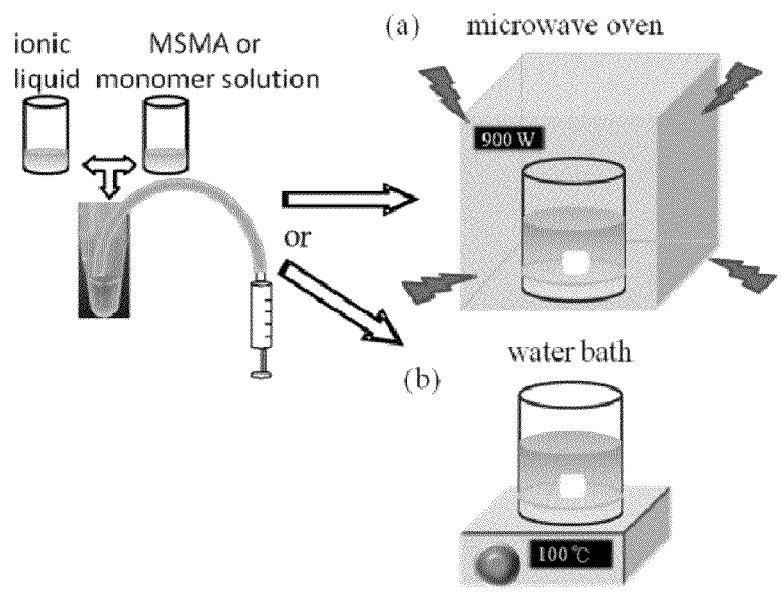
FIG. 2 is a schematic diagram illustrating column vinylization and monolith synthesis with IL solvent under a) microwave heating and b) 100° C. water bath.

A polymerizable mixture composed of monomers, reaction medium (solvents) and an initiator was used to prepare the monolithic materials. This solution was made by dissolving the initiator (AIBN, 1 mg), charged monomer (VBSA, 1 mg, only used for CEC application) in various monomer solutions, which included BMA, DVB. Reaction medium ([$C_6$mim] [$BF_4$]) was slowly added to the monomer mixture. The mixture solution was sonicated for 15 min until it became homogeneous, then it was used to fill the vinylized capillary by syringe injection. After both ends of the capillary were sealed with epoxy adhesive resin, the capillaries were microwaved (900 W, 5 min) in a beaker with RT water (FIG. 2).

Figure 5:
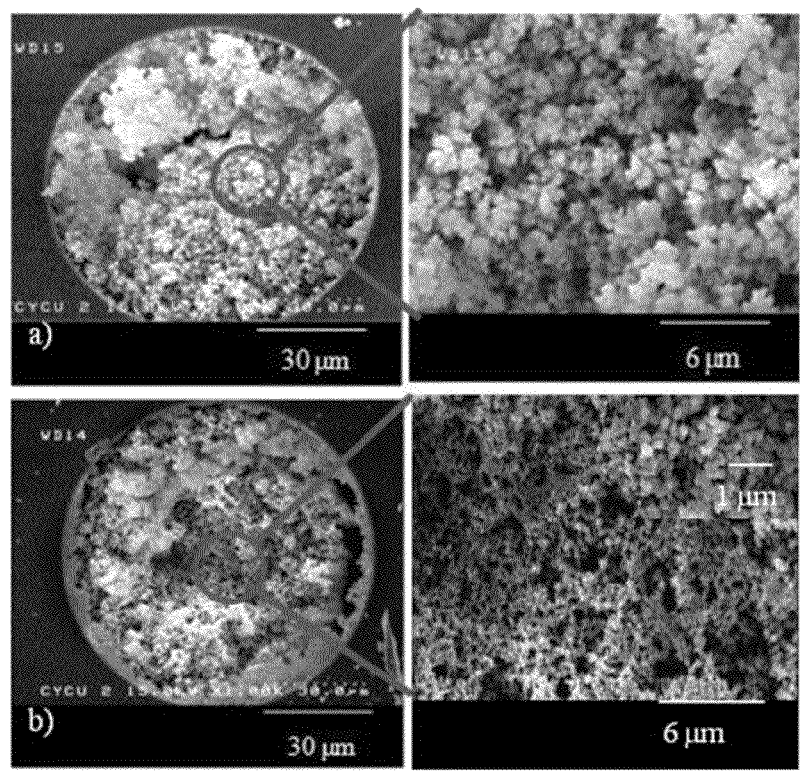
FIG. 5 shows SEM images of BMA-DVB monolithic columns using ionic liquid as the reaction solvent with heat-treatment: a) 100° C. water bath, 3 min; b) microwave irradiation, 900 W, 5 min.

SEM images of the BMA-DVB monoliths showed strong attachment onto the column inner wall in both conventional conditions (FIG. 3a, 17 hours) and in the [$C_6$mim] [$BF_4$] medium with microwave heating (FIG. 3c, 5 minutes), but an obvious detachment of the monolithic materials from the capillary inner wall was observed in the methanol medium with microwave heating (FIG. 3b, 5 min).

Without wishing to be bound by theory, it is believed that [$C_6$mim][$BF_4$] is composed of cation-anion pairs with high polarity and, therefore, provides a much stronger microwave absorbing ability than volatile methanol. As a result, a brief microwave irradiation enabled a dramatic reduction in the reaction time from the previous 17 h to 5 min when [$C_6$mim] [$BF_4$] was used as the reaction medium (almost a 204-fold decrease). Comparison of the vinylization procedure using an ionic liquid by microwave irradiation and water bath heating showed that the former produced a complete and homogenous monolith. The results suggest an improved vinylization procedure that employs an IL attained in the shortest time via a 5-minute microwave heating. This rapid column vinylization approach produced the monolithic materials strongly bonded on fused silica columns, and the tight adhesion is still maintained after these monoliths experienced a series of chromatographic elutions.

Example 2

Effect of Reaction Medium and Heat-Treatment on in situ Free Radical Polymerization Procedure The procedure of Example 1 was repeated except that two solvent systems, traditional solvent (cyclohexanol and N-methyl-2-pyrrolidone (NMP)) and ILs solvent ([$C_6$mim] [$BF_4$]). were employed for BMA-DVB monolith preparations via a 100° C. water bath or microwave heating. Note that all columns have been vinylized via the optimal vinylization conditions mentioned above (i.e. FIG. 3c) prior to monolith syntheses. Optical microscope images of the capillaries showed that the amount of BMA-DVB monoliths produced by the traditional solvent was less whether a 100° C. water bath (10 to 60 min) or microwave heating (5 to 30 min) was used compared with using [$C_6$mim] [$BF_4$] as the reaction medium, where more BMA-DVB monoliths were produced within 3 or 5 min either in a 100° C. water bath or with microwave irradiation.

In contrast to a previous report wherein the synthesis of BMA-DVB monolith was complete using the same traditional solvent and water bath (70° C., 15 h) (H. Y. Huang, Y. J. Cheng, W. L. Liu, Y. F. Hsu and S. Lee, *J. Chromatogr., A*, 2010, 1217, 5839; and S. Eeltink, M. H. M. Jose, G. P. Rozing, P. J. Schoenmakers and W. T. Kok, *Anal. Chem.*, 2005, 77, 7342), using [$C_6$mim] [$BF_4$] as the solvent provided an enhancement of the polymerization rate of about 180-fold (100° C. water bath) to 300-fold (microwave heating).

Example 3

The procedure of Example 2 is repeated, except that the polymerizable mixture used in Example 2, which contains the monomer combination of BMA and DVB, is replaced with either a combination of styrene (St) and DVB, or a combination of butylmethacrylate (BMA) and ethylene dimethacrylate (EDMA). The results are show in FIG. 4, indicating that both of these monolithic materials, i.e., poly(styrenedivinylbenzene) (St-DVB) andpoly(butylmethacrylate-ethylenedimethacrylate) (BMA-EDMA), were also successfully synthesized within 5 min using [$C_6$mim] [$BF_4$] medium, as confirmed by optical microscopy.

With these findings, the invention demonstrated high efficiency in the preparation of three commonly used monolith materials namely methacrylate ester-, styrene- and mixed methacrylate ester-styrene-based polymers.

Example 4

Microstructures of the Monolithic Stationary Phases Prepared According to the Invention SEM images showed that the BMA-DVB monoliths prepared in Example 2 using the $[C_6mim][BF_4]$ solvent had adequate porous properties to maintain good permeability and sieving effect (100° C. water bath (FIG. 5a) and microwave irradiation (FIG. 5b)) which are very important issues in chromatographic and microreactor applications. Studies on monolithic materials have demonstrated that the type and the ratio of the reaction medium have a strong influence on the monolith morphology (H. Y. Huang, Y. J. Cheng, W. L. Liu, Y. F. Hsu and S. Lee, *J. Chromatogr., A,* 2010, 1217, 5839; and S. Eeltink, M. H. M. Jose, G. P. Rozing, P. J. Schoenmakers and W. T. Kok, *Anal. Chem.,* 2005, 77, 7342).

The observation in FIG. 5 clearly points out that the IL solvent does not only speed up the monolithic material production, but also has possibly modified its microstructure. There are much smaller granules formed in BMA-DVB monolith prepared by microwave heating when compared with those prepared in a 100° C. water bath, suggesting that the monolithic material produced by the inventive method would possess a larger surface area and therefore provide higher chromatographic resolution as compared with those produced by the conventional methods. The SEM images show that the inventive monolithic material is formed uniformly in all dimensions, suggesting that it is able to reduce the diffusion factor for analytes during a chromatographic process and significantly increase the separation effect. The results further suggest that the polymer particles were more easily dispersed in the IL solvent as they form small sizes, and cause phase separation between the polymer particles and IL medium to be delayed in the microwave irradiation.

Example 5

Chromatographic Performance

The chromatographic performance of the BMA-DVB monolith was evaluated based on the ability to separate aromatic compounds (six alkyl benzenes for CEC and four paraben standards for nano-LC/MS).

An LC pump was used to wash the monolithic column first with methanol to remove the unreacted reagents and then with the mobile phase to condition the monolithic columns for subsequent CEC and nano-LC/MS analyses. The CEC separations were performed with an applied voltage of 25 kV at 25° C. where a mixture of acetonitrile (ACN) and the phosphate buffer (5 mM) in a volume ratio of 55:45 was used as the mobile phase. The analyte solution was electrokinetically injected at 5 kV for 3 s and detected by an UV detector at 214 nm. Mobile phase compositions in nano-LC/MS were 90%: 10% ACN: $H_2O$ (B) and 100% $H_2O$ (C) using 1 M ammonia water to adjust pH. Paraben analytes (1 ppm each) were separated with a gradient elution program as follows: 1-70% B in 25 min and reduced to 1% in 35 min. Analytes were detected via on-line nanoESI-ion trap mass spectrometer operated in a negative mode wherein the molecular ion signals ([M−H]-form) of parabens with m/z's 151 (methyl), 165 (ethyl), 179 (propyl) and 193 (butyl) were monitored.

Figure 6:
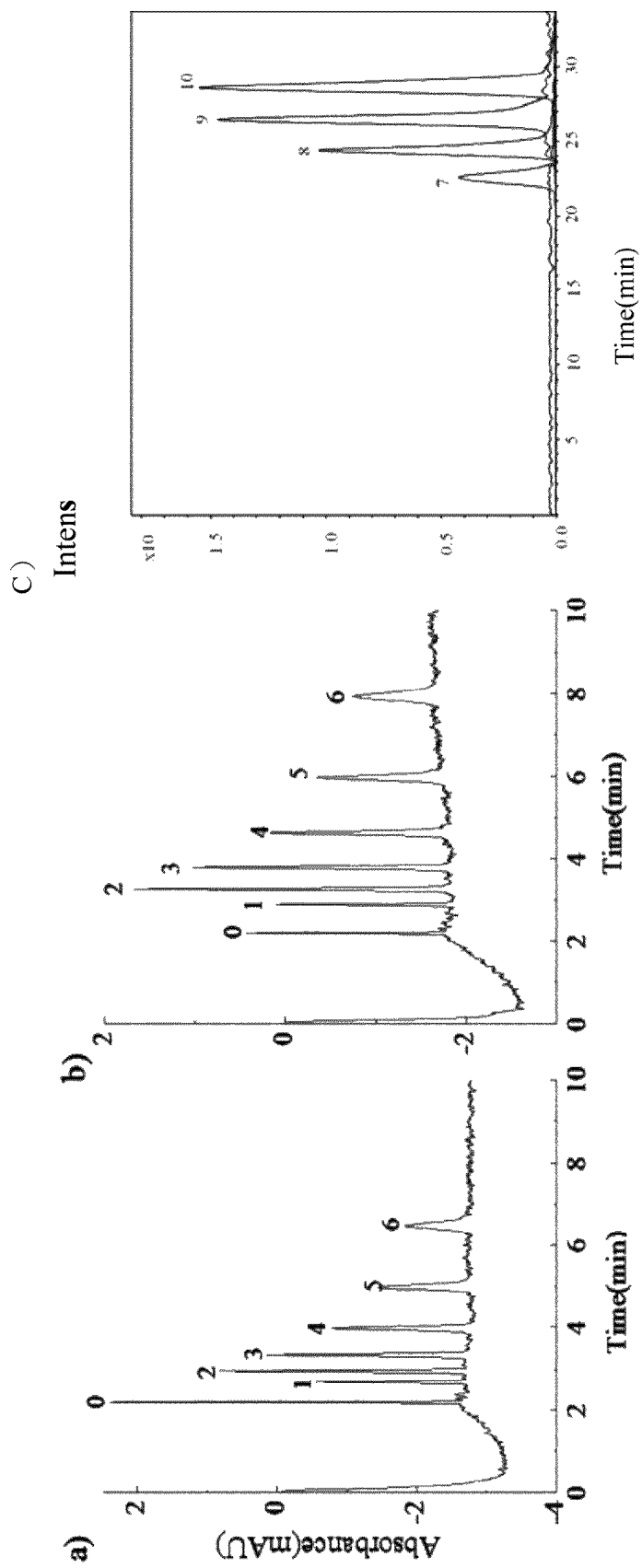
FIG. 6 shows CEC separation of neutral aromatic compounds on BMA-DVB monolithic columns prepared using [C$_6$mim][BF$_4$] solvent with heat treatment of a) water bath at 100° C. (3 min) and b-c) microwave irradiation (5 min), with peak identity: 0) thiourea, 1) benzene, 2) toluene, 3) ethylbenzene, 4) propylbenzene, 5) butylbenzene, 6) pentylbenzene, 7) methyl-, 8) ethyl-, 9) propyl- and 10) butyl parabens.

FIG. 6 shows the CEC and nano-LC/MS chromatograms after optimization of the mobile phase and operation conditions. All monolithic columns provided baseline separation within 10 min with highly reproducible separation efficiency.

In conclusion, this novel synthetic approach of combining IL solvent and microwave heating is a highly efficient and green method for the manufacture of monolithic materials, which may allow depletion of the emission of VOCs into the environment and reach the goal of energy saving. In addition to chromatographic applications, the invention is adapted for use in various technical fields, including proteomics and microreactors.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit of the invention and the scope thereof as defined in the appended claims.

What is claimed is:

1. A method of manufacturing a monolithic stationary phase comprising the steps of:
    (a) providing a substrate having a working surface;
    (b) vinylizing the working surface in the presence of an ionic liquid as a solvent by reacting the working surface with an alkoxy silane compound that is reactive to the working surface to create a Si—O—Si linkage and has a pendant vinyl functionality and applying microwave radiation at a power level sufficient for the vinylization, thereby obtaining a vinylized working surface having reactive vinyl groups thereon; and
    (c) initiating an in situ free radical polymerization of a polymerizable mixture containing a vinyl monomer in the presence of an ionic liquid as a solvent to result in a polymer-based monolithic stationary phase grafted to the vinylized working surface.

2. The method according to claim 1, wherein the substrate is a fused silica capillary column having a working surface provided with silanol functionality (—SiOH).

3. The method according to claim 1, wherein the alkoxy silane compound is selected from the group consisting of tetraethylorthosilicate (TEOS), tetramethoxyorthosilicate (TMOS), poly(ethoxydisiloxane) (PEDS), 3-(trimethoxysilyl)propyl methacrylate (MSMA), 3-[tris(trimethylsiloxy)silyl]propyl methacrylate, 3-(diethoxysilyl)propyl methacrylate, 3-(dimethylchlorosilyl)propyl methacrylate, and 3-(trichlorosilyl)propyl methacrylate, and combinations thereof.

4. The method according to claim 3, wherein the alkoxy silane compound is 3-(trimethoxysilyl) propyl methacrylate (MSMA) and the substrate is a fused silica capillary column.

5. The method according to claim 1, wherein the polymerizable mixture comprises a polyvinyl monomer selected from the group consisting of divinylbenzene, divinylnaphthalene, divinylpyridine, $C_1$-$C_6$ alkylene dimethacrylates, hydroxyl-$C_1$-$C_6$ alkylene dimethacrylates, hydroxyl-$C_1$-$C_6$ alkylene diacrylates, oligoethylene glycol dimethacrylates, oligoethylene glycol diacrylates, vinyl esters of polycarboxylic acids, divinyl ether, pentaerythritol di-, tri-, or tetramethacrylate or acrylate, trimethylopropane trimethacrylate or acrylate, $C_1$-$C_6$ alkylene bisacrylamides or methacrylamides, and any combinations thereof.

6. The method according to claim 5, wherein the polymerizable mixture further comprises a monovinyl monomer selected from the group consisting of un-substituted and substituted styrenes, acrylates, methacrylates, vinylacetate, vinylpyrrolidone, vinylnaphthalene and any combinations thereof.

7. The method according to claim 6, wherein the polymerizable mixture comprises a monomer combination of butyl methacrylate (BMA) and divinylbenzene (DVB), styrene (St) and divinylbenzene (DVB), or butyl methacrylate (BMA) and ethylene dimethacrylate (EDMA).

8. The method according to claim 1, wherein the ionic liquid is a salt with a melting point below 100° C.

9. The method according to claim 8, wherein the ionic liquid has a dielectric constant ranging from about 8.9 to about 15.2.

10. The method according to claim 9, wherein the ionic liquid is selected from the group consisting of 1-hexyl-3-methylimidazolium tetrafluoroborate ($[C_6mim][BF_4]$), 1-ethyl-3-methylimidazolium bis(trifluoromethylsulfonyl)imide ([Emim][TF]), 1-butyl-3-methylimidazolium bis(trifluoromethylsulfonyl)imide ([Bmim][TF]), 1-butyl-3-methylimidazolium tetrafluoroborate ($[Bmim][BF_4]$), 1-butyl-3-methyl imidazolium hexafluorophosphate ($[Bmim][PF_6]$) and 1-hexyl-3-methylimidazolium hexafluorophosphate ($[Hmim][PF_6]$) and any combinations thereof.

11. The method according to claim 1, wherein the polymerization step (c) is performed under microwave radiation.

12. The method according to claim 1, wherein the microwave radiation is applied at a power level of about 800-1000 W for about 5 minutes.

13. The method according to claim 11, wherein the microwave radiation is applied at a power level of about 800-1000 W for about 5 minutes.

14. The method according to claim 1, wherein the polymerization step (c) is performed by applying heat from a water or oil bath at a temperature sufficient for proceeding with the polymerization.

15. A monolithic stationary phase produced by the method according to claim 1.

* * * * *